Nov. 1, 1932.  E. G. PURDY  1,886,221

MOTOR VEHICLE CONSTRUCTION

Filed April 7, 1931

INVENTOR
*Emmett G. Purdy.*
BY
*Harness, Dickey, Pierce & Hann,*
ATTORNEYS.

Patented Nov. 1, 1932

1,886,221

UNITED STATES PATENT OFFICE

EMMETT G. PURDY, OF DETROIT, MICHIGAN, ASSIGNOR TO DETROIT BODY DIE COMPANY, A CORPORATION OF MICHIGAN

MOTOR VEHICLE CONSTRUCTION

Application filed April 7, 1931. Serial No. 528,338.

This invention relates to motor vehicles and it has particular relation to a device for supporting the hood of a motor vehicle.

One object of the invention is to provide a device for supporting the hood of a motor vehicle, which will always maintain the hood in proper alignment with the body of the latter.

Another object of the invention is to provide means for supporting the hood of a motor vehicle, which will obviate noise adjacent the cowl and hood portions of the vehicle.

Another object of my invention is to provide a device for supporting a hood of a motor vehicle, which will prevent foreign substances, such as water, from seeping between the edges of the hood and the elements supporting it.

Prior to the invention the hood of a motor vehicle was supported by disposing one of the ends on the radiator and the other end on the cowl portion of the vehicle. Ordinarily the ends of the hood projected beyond the edge of the radiator and cowl of the vehicle, and frequently a portion of the hood projected past the edge of the cowl beyond the limit intended therefor, with the result that the edge portion of the hood would mar or otherwise deface the finish of the cowl. Moreover, any foreign substance, such as water and the like, could readily enter between the cowl and the hood, which frequently caused substantial damage and expense to the electrical units, comprising a part of the motor.

In this invention a support or connection between the cowl member and the hood has been provided in which means provided on the hood co-act with a portion of the cowl, thereby providing a connection in which the hood is always maintained in the same position. Also, rubber or the like is disposed in the channel and between the hood and cowl adjacent the channel, thereby providing a substantially water tight seal between these members and a cushioning support for the hood.

For a better understanding of the invention, reference may now be had to the accompanying drawing, forming a part of this specification, in which.

Figure 1:
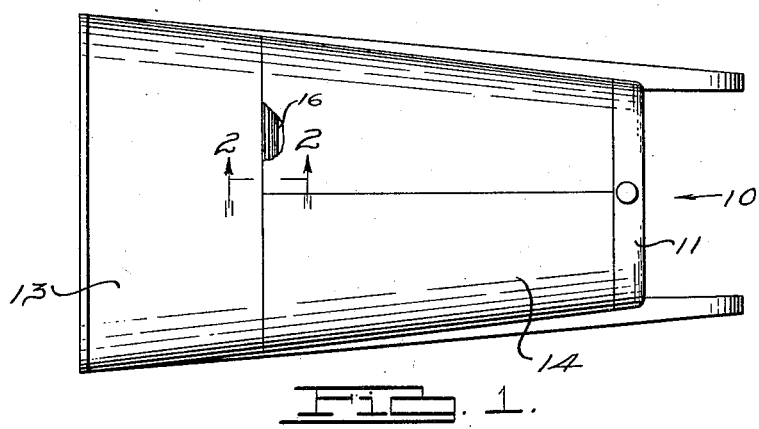
Fig. 1 is a fragmentary plan view of a motor vehicle, with a portion broken away, disclosing a support or connection for a hood constructed in accordance with my invention.

In practicing my invention a motor vehicle 10 having a radiator 11, a dash portion 12 and a cowl panel 13 is provided with a hood 14. The cowl 13 at its forward end extends obliquely toward the dash 12, as indicated at 15, then horizontally as indicated at 15', and finally terminates in a channel portion 16. A channel shape rubber gasket 17 or gasket composed of other suitable material is disposed in the channel 16 and has a portion extending over the portion 15 of the cowl, as indicated at 19. A reversely bent portion 20 of the hood 14 terminates in a flange 21 normal to the surface of the hood, which projects into the rubber channel 17. It will be observed that in extending the flange 21 at right angles to the surface of the hood, and into the gasket 17, a connection is provided, which makes it practically impossible to move the hood out of alignment with the edge of the cowl. Also, the outer surface of the hood is maintained in alignment with the outer surface of the cowl, and is resiliently supported by the rubber portion 17.

Figure 2:
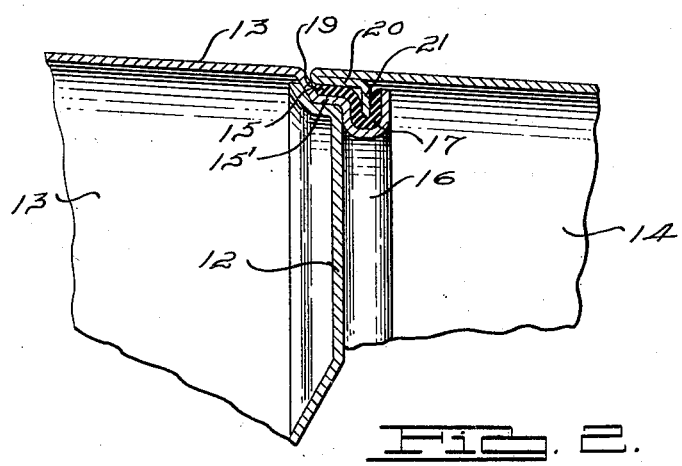
Fig. 2 is an enlarged cross-sectional view, taken substantially along line 2—2 of Fig. 1.
Figure 3:
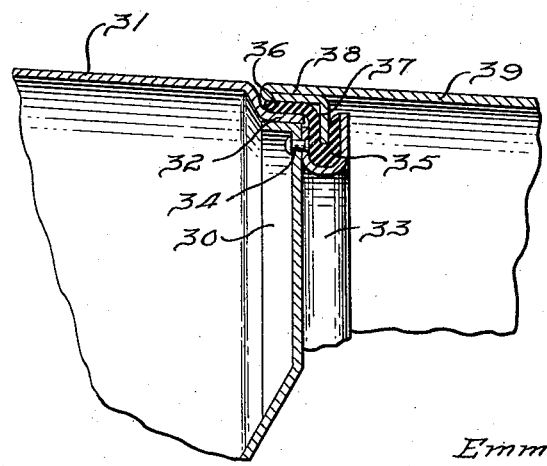
Fig. 3 is a cross-sectional view similar to that shown by Fig. 2, illustrating another form of the invention.

Another form which my invention may assume, as shown in Fig. 3, includes a dash 30, and a cowl 31 having a portion 32 similar to the portion 15' shown by Fig. 2, which is supported by the dash 30. The outer edge of the surface 32 terminates at the outer edge of the dash 30, and a channel member 33 is secured to the dash by means of rivets 34. Disposed within the member 33 is a rubber gasket 35, substantially identical to the gasket 17, a portion of which extends over the cowl shoulder 32, as indicated at 36. Centrally disposed within portions of the gasket 35 and supported by the channel 33 is a flange 37, which is formed by reversely bending a portion 38 of the hood 39, and then in a direction normal to the surface of the hood.

From the foregoing description, it is apparent that a hood for motor vehicles has been provided which is so supported that metal to metal contact between the cowl and hood is avoided by a resilient rubber gasket. The connection between the hood and cowl prevents noise and additionally prevents the edge of the hood from scratching the surface of the cowl. Moreover, the connection is substantially water tight, thereby preventing water from seeping between the hood and cowl.

Although I have illustrated preferred forms which my invention may assume, and have described them in detail, it will be apparent to those skilled in the art that my invention is not so limited but that various minor modifications and changes may be made therein without departing from the spirit of my invention or from the scope of the appended claims.

I claim:

1. A device for supporting the hood of a motor vehicle comprising a cowl having a shoulder portion adjacent one end thereof and a channel portion at one side of the shoulder portion, a rubber gasket positioned in the channel portion, a part thereof extending over the shoulder portion, and a hood having a reversely bent portion terminating in a flange disposed in the gasket, the end of the hood being supported by the shoulder portion of the cowl.

2. A device for supporting the hood of a motor vehicle, comprising a dash panel, a cowl panel having a shoulder portion adjacent one end thereof, the shoulder portion abutting the outer periphery of the dash panel, a channel member rigidly secured to the dash panel adjacent one end of the shoulder portion, a rubber gasket positioned in the channel member, one end thereof extending over the shoulder portion of the cowl, and a hood having a reversely bent portion terminating in a flange extending at right angles to the surface of the hood, into the channel, the end of the hood being supported by the shoulder portion of the cowl panel.

3. The combination with a motor vehicle having a dash and radiator mounted thereon, of a device for supporting the hood of the vehicle, comprising a cowl having a shoulder portion adjacent one end thereof, a channel portion integral with the shoulder portion, a gasket positioned in the channel, a part of which is supported by the shoulder portion, and a hood having a reversely bent portion terminating in a flange centrally disposed in the gasket, the end of the hood being supported by the shoulder portion of the cowl panel.

4. The combination with a motor vehicle having a dash and radiator mounted thereon, of a device for supporting the hood of the vehicle, comprising a cowl having a shoulder portion adjacent one end thereof, a channel portion integral with the shoulder portion, a gasket positioned in the channel portion, a part of which is supported by the shoulder, and a hood having a reversely bent portion terminating in a flange centrally disposed in the channel gasket at right angles to the surface of the hood, the end of the hood being supported by the shoulder portion of the cowl panel.

5. The combination with a motor vehicle having a dash and cowl mounted thereon, having a shoulder portion supported by the dash, of a device for supporting the hood of the vehicle, comprising a channel member rigidly secured to the dash, a gasket positioned in the channel portion thereof and extending over the shoulder portion of the cowl, and a hood having a reversely bent portion terminating in a flange at right angles to the surface of the hood, the flange being centrally disposed in the gasket, the end of the hood being supported by the shoulder portion of the cowl.

6. The combination with a motor vehicle having a dash and radiator mounted thereon, of a device for supporting the hood of the vehicle, comprising a cowl having a shoulder portion adjacent one end thereof, a channel portion integral with the shoulder portion, a gasket positioned in the channel portion, a part of which is supported by the shoulder, a hood, a flange on said hood disposed in the channel gasket at substantially right-angles to the surface of the hood, the end of the hood being supported by the shoulder portion of the cowl panel.

EMMETT G. PURDY.